United States Patent [19]

Stanley et al.

[11] 4,047,247

[45] Sept. 6, 1977

[54] ADDRESS FORMATION IN A MICROPROGRAMMED DATA PROCESSING SYSTEM

[75] Inventors: Philip E. Stanley, Westboro; William E. Woods, Natick; Kenneth J. Izbicki, Hudson, all of Mass.

[73] Assignee: Honeywell Information Systems Inc., Waltham, Mass.

[21] Appl. No.: 674,517

[22] Filed: Apr. 7, 1976

[51] Int. Cl.² .............................................. G06F 9/20
[52] U.S. Cl. ................................................ 364/200
[58] Field of Search .................... 340/172.5; 445/1; 364/200

[56] References Cited

U.S. PATENT DOCUMENTS

| 3,320,594 | 5/1967 | Davies | 340/172.5 |
| 3,391,394 | 7/1968 | Ottaway et al. | 340/172.5 |
| 3,408,630 | 10/1968 | Packard et al. | 340/172.5 |
| 3,720,920 | 3/1973 | Watson et al. | 340/172.5 |
| 3,739,352 | 6/1973 | Packard | 340/172.5 |
| 3,786,434 | 1/1974 | Frye et al. | 340/172.5 |

*Primary Examiner*—Harvey E. Springborn
*Attorney, Agent, or Firm*—John S. Solakian; Ronald T. Reiling; Nicholas Prasinos

[57] ABSTRACT

A final effective address of an operand is generated in a microprogrammed data processing system by use of a base address register which may include an unindexed address, an index register which may include an index address value, an instruction register which may include an instruction word, which instruction word provides control over the addressing of a control store dependent upon the state of a selected one of a plurality of test conditions. The addressed control store word provides signals for controlling the operation of the system, including the branching between such major operations as instruction fetching, addressing, reading, writing, and execution as well as branching between minor operations which are included in the major operations.

3 Claims, 11 Drawing Figures

| 0 | 3 | 4 | 7 | 8 | 12 | 13 | 15 | 16 | 17 | 23 | 24 | 25 | 26 | 31 | 32 | 35 | 36 | 39 | 40 | 45 | 46 | 55 |
|---|---|---|---|---|----|----|----|----|----|----|----|----|----|----|----|----|----|----|----|----|----|----|
| LS | | RS | | AF | | AM | | AFC | GC | | SM | | BI | | BS | | BR | | TC | | NA | |

4,047,247

ADDRESS FORMATION IN A MICROPROGRAMMED DATA PROCESSING SYSTEM

BACKGROUND OF THE INVENTION

The present invention relates to data processing systems and more particularly to the addressing architecture associated therewith.

The so-called throughput of a data processing system depends upon many factors, including the efficiency of the addressing technique used. Such throughput is increased for example by minimizing operations required such as for example that resulting by using index registers in combination with one or more base address registers, thereby enabling addressing to various non-contiguous locations in memory without the need to change the base address each time a different such location needs to be addressed. Instead, the address in the base register may remain the same and the index value may be changed. This advantage may be provided for example during so-called memory stack push or pop operations. Such an addressing system becomes more efficient by providing a technique by which bytes and bits may be effectively addressed, in addition to the word addressing mode normally provided. By way of example, good byte manipulation capabilities facilitates the writing of compact computer programs which operate on character data. Such programs are especially common in a data communications environment. In addition, good bit manipulation facilities permit compact storage of "on-off" indicators and similar one bit quantities. They also make for more compact and efficient program where memory data must be accessed on a bit-by-bit basis. The result is less time and memory space for an application. Such bit addressing thus allows efficient testing, setting, resulting, complementing, etc., of the addressed bit.

It is accordingly a primary object of the present invention to provide a data processing system having an improved addressing architecture.

SUMMARY OF THE INVENTION

The above stated object and other objects are achieved according to the present invention by providing a data processing system which includes an instruction register for storing an instruction word, a control storage device having a plurality of control words stored therein, each including a plurality of fields which fields provide signals for controlling the operation of the system. One of such fields is used for indicating an address for the next control word to be addressed dependent upon a specified test result. Further included coupled with the system is a memory device having a plurality of locations each for storing a word. A base register for storing a base address of a location in the memory device and an index register for storing an index value for use with such base address in computing a final effective address of a location in the memory device is also provided. Apparatus for reading an instruction word from the memory device and writing the instruction word into the instruction register as well as test logic which comprises apparatus responsive to the most recently addressed control word for selecting a test input from different ones of logic elements included in the system, including the instruction register, is also provided. Also included in the test logic is apparatus which is responsive to the most recently addressed control word and the state of the selected one of the test inputs for generating a test logic output. Next address generation logic, responsive to such test logic output, to the instruction word and to the most recently addressed control store word, generates an address of a location in the control storage device. Address formation is provided under the control of the contents of the instruction register and the addressed control word to provide branching between major operations such as instruction fetch, address, read, write execute, etc. and minor branches included in each of major branches.

BRIEF DESCRIPTION OF THE DRAWINGS

The above and other objects of the present invention are achieved in the illustrative embodiment as described with respect to the Figures in which.

DETAILED DESCRIPTION OF THE PREFERRED EMBODIMENTS

Figure 1:
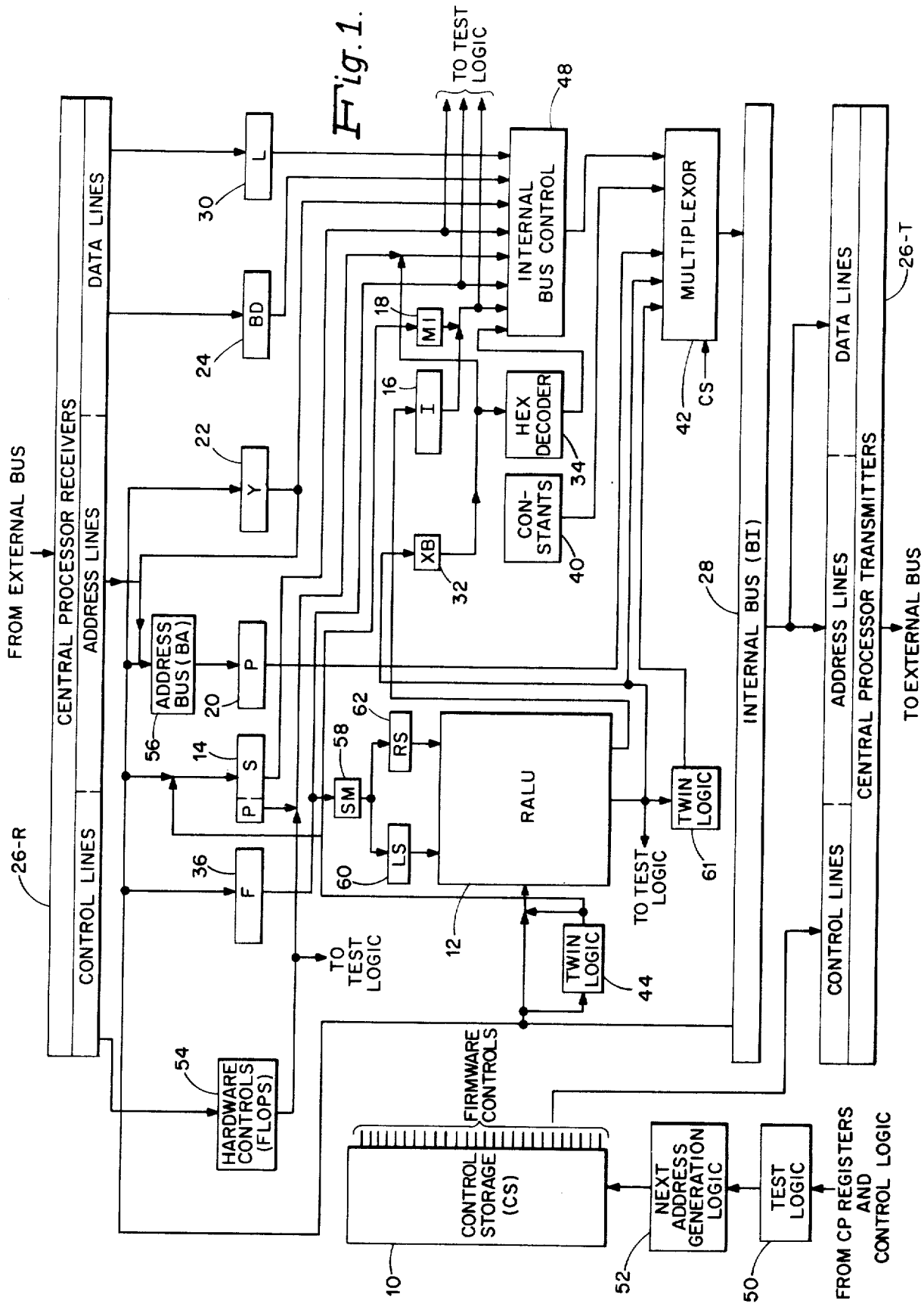
FIG. 1 illustrates a general block diagram of the overall system in which the present invention is included.

A block diagram of the data processor the data processing system of the present invention is shown in FIG. 1. The system includes a control store 10 which includes by way of example 512 locations, each location including 56 bits. Each such location is capable of storing a firmware word, such firmware words being used to control various hardware operations within the data processor. It is understood that the number of such locations and/or firmware words and the number of bits in such words may be increased or decreased without departing from the scope of the present invention. Operation of a control store and the instruction decoding thereof is shown in the article entitled, "Designing Optimized Microprogrammed Control Sections for Microprocessors", by G. W. Schultz, appearing at page 119 of the April, 1974 issue of Computer Design magazine.

Figure 2:
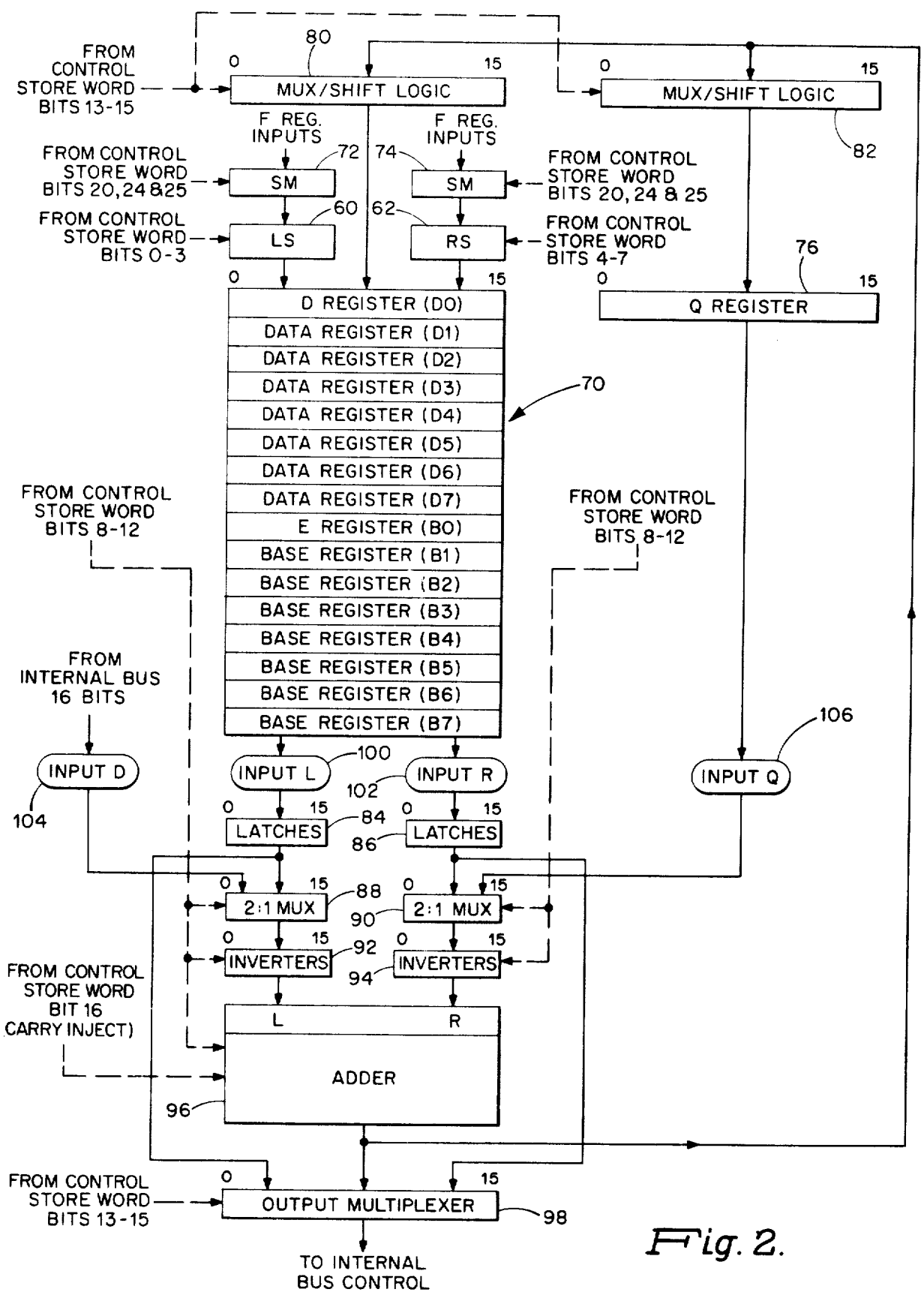
FIG. 2 provides a general block diagram of the microprocessor logic utilized in the data processor shown in FIG. 1.

Also included in the data processor is a register and logic unit (RALU) 12 which is sometimes referred to as the microprocessor. FIG. 2 is a block diagram of the RALU 12 illustrating the details thereof. In general, the RALU is divided into four areas which include a register file, shift logic, arithmetic logic, and control logic. The register file includes data registers, working registers and base registers. The shift logic is used during shift operations and normal transfers of data. The arithmetic logic includes various latches or buffers, multiplexors, inverters and an adder unit. The control logic of the RALU includes selector logic for selecting that portion of data to be operated upon.

The central processor for the present invention includes various registers some of which are not essential to the present invention but which will be generally discussed for background purposes. The status/security register 14 contains the system status and security keys. This register includes bit fields which indicate whether or not the system is in the privileged state (P) or whether it is in the user state. During the user state, specified instructions will enter a so-called trap routine instead of being executed. The register 14 also includes a field for indicating the i.d. number of the processor, and is set during system configuration. The register 14 also includes a field for indicating the interrupt priority level of the central processor. All devices coupled in the system include an interrupt level. The current running program in the central processor will be interrupted if the device includes a level number which is lower than the actual level number of the running program wherein the lower level number indicates a process and/or device which is least interruptable. Such interrupt structure is shown in U.S. Pat. No. 3,984,820, issued on Oct. 5, 1976.

The indicator register (I) 16 contains the overflow and program status indicators. This register 16 also includes various fields among which are included fields for indicating the results of any comparison which was made in the system, and indication or status of the last peripheral device which was interrogated, and a field to indicate the state of the last bit tested.

The M1 register 18 contains trap enable mode control keys, which include a field for enabling a trace trap (i.e., a trap which assists in tracing a computer program's operation) for jump and branch instructions.

The program counter (P register) 20 is by way of example a 16 bit register which normally contains the address of the instruction currently being executed. The Y register 22, i.e., the memory address register, is also by way of example a 16 bit register that normally contains the address of data to be accessed in memory. The bus data register (BD) 24 is also by way of example a 16 bit register that receives bus data from the receiver logic 26 for distribution throughout the processor via the internal bus 28. The interrupt register (L) 30 is also by way of example a 16 bit register that receives a channel number and level of an interrupting device via the receive lines 26-R.

The XB register 32 is by way of example a four bit register that is used for bit and byte indexing within the processor. The output of this register 32 is coupled to both the internal bus 28 and the decoder logic 34. The instruction register (F) 36 is by way of example a 16 bit register that holds the instruction word as it is received from a memory which may be coupled to the external bus.

The constant generator logic 40 is coupled to provide specific constants to the multiplexer 42 for use in association with the processor's firmware included within control store 10. Decoder logic 34 includes a four to 16 bit multiplexor that is used to generate a mask for bit operations. That is, one out of 16 bits is selected for testing for use by the firmware included in control store 10. The input twin logic 44 provides the capability of either duplicating the most significant (left hand) character (byte) or performing a straight through transfer from the internal bus 28 to the RALU 12. Output twin logic 61 provides similar capabilities as described for FIG. 8.

Figure 9:
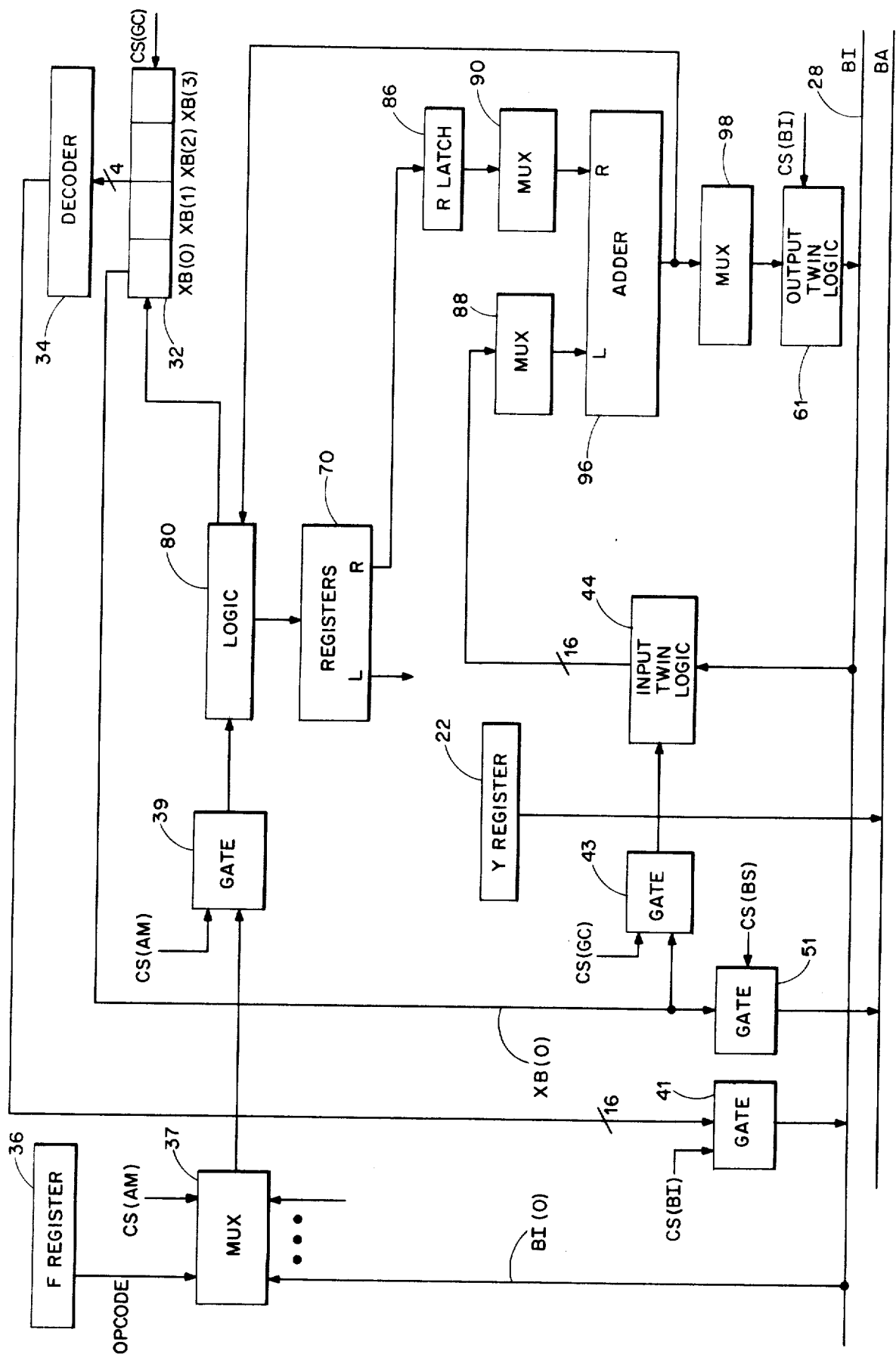
FIG. 9 provides a more detailed block diagram of the manner in which a byte or bit may be effectively addressed by the data processor shown in FIG. 1.

The internal bus control logic 48 utilizes bits 26 through 31 of the firmware word in control store 10 to gate the contents of selected processor registers onto the internal bus 28 via the multiplexer 42. Certain gate elements of logic 48 are illustrated in FIG. 9 and to some extent in U.S. Pat. No. 3,993,981, issued on Nov. 23, 1976. Multiplexer logic 42 includes the logic by which data is transmitted to the internal bus 28, with only one input enabled for transfer at any given time.

Test logic 50 selects by way of example one of 64 possible test conditions, using control store bits 40 through 45. Depending upon whether the tested condition is true or false, the signal (TSTRUE or TSTRUE) is transmitted to the next address generation logic 52. See FIGS. 10 and 11. The processor utilizes one of two methods to generate the next firmware address. The first method uses bits 46 through 55 of the control store word to form the next address. These bits may for example comprise a 10 bit address field (next address, NA) that can directly address one of potentially 1,024 control store locations. The second method obtains the next address from logic circuitry that contains several preassigned addresses. The address selected is determined basically by a decode of the F register 36 contents and the control store 10 outputs.

The internal bus (BI) 28 is by way of example 16 bits wide and is primarily used to transfer data between the processor's registers. Memory addresses and data are also transferred to the external bus via the internal bus 28. The address bus register 156 is by way of example 16 bits wide and is used to transfer the addresses for the input and output and memory read or write cycles to the logic 26-R and T. The transceiver logic 26 (26R and 26T) include logic circuitry which are the only interface between the central processor and the external bus. All data, address and interrupt signals must pass through the transceiver logic 26. Such transceiver logic 26 as well as the operation of the external bus is described in application Ser. No. 591,964, filed on June 30, 1975.

The select modifier logic (SM) 58 determines which bits of the F register 36 (if any) are used to modify the register file selection performed by the LS and RS fields, i.e., the left select and right select fields of the control store word of control store 10. The SM logic gates F register bits 1 through 3, 10 through 11 and 13 through 15 or 12 through 15 depending upon the configuration of control store bits 20, 24 and 25 to both the left and right selector logic, i.e. LS logic 60 and RS logic 62. The LS and RS logic uses the selector modifier 58 output and the contents of control store bits 0 through 3 or 4 through 7 for register selection. Control store bits 0 through 3 are used by the left selector. Control store bits 4 through 7 are used by the right selector.

The external bus provides a common communcation path or interface among all units, including memory, of the system as shown in U.S. Pat. No. 3,993,981, issued on Nov. 23, 1976. The external bus is asynchronous in design and units of varying speed are operated efficiently on the system with three types of communication permitted, namely, memory transfers, input/output transfers, and interrupts. The external bus may have coupled thereto, the central processor, a memory unit, perpheral device controllers, communications controllers and the like. The above noted registers, etc. are further described in a Honeywell Information System Inc. publication dated January, 1976, entitled, "Honeywell Level 6 Minicomputer Handbook", order number AS22.

Now referring to FIG. 2, the register and logic unit (RALU) 12 as illustrated in detail. RALU 12 may comprise four model 6701 microcontrollers manufactured by Monolithic Memories Inc. and described in their publication therefor dated August, 1974. As indicated hereinbefore, the RALU 12 is divided into four basic areas, more particularly a register file, shift logic, arithmetic logic, and control logic. First referring to the register file 70, it includes the data registers D1 through D7, the working register DO (or D) and E, and base registers B1 through B7. Registers D1 through D7 are by way of example 16 bit word operand registers, with bit zero being considered the most significant bit. Registers D and E are also by way of example 16 bit registers and are used for manipulating data during firmware operations, the register D is used to hold a copy of the contents of the instruction register (F) 36. The base registers are also by way of example 16 bit address registers that can be used for formulating addresses by pointing to any procedure, data or arbitrary location in the system. The base registers also have an auto increment and auto decrement capability to allow easy use of these registers for stacks, queues and program loop operations.

Multiplexer shift logic 80 and 82 primarily include two 16 bit multiplexers that are used for both shift operations and normal transfers of data. An additional 16 bit register (Q) 76 is provided for double operand shifts. Data can be shifted left or right by one bit between the multiplexers and any data register within the register file 70. In the present invention, Q register 76 normally includes an unindexed address and the E register (BO) includes an index value.

The arithmetic logic is comprised of two 16 bit latch circuits 84 and 86, two-two to one multiplexers 88 and 90, two 16 bit inverters 92 and 94, adder unit 96 and an output multiplexer 98. The latches associated with input L100 receive data from the register file 70 as selected by the left selector logic 60. Similarly, the latches associated within input R 102 receive data from the register file 70 as selected by the right selector logic 62. Outputs from these latches feed both the two to one multiplexers 88 and 90 respectively and the output multiplexer 98. The left-hand multiplexer 88 receives data from the internal bus 28 via input D 104 and the latches 84 associated with input L 100. The right-hand multiplexer 90 receives data from the Q register 76 via input Q 106 and the latches 86 associated with input R 102. The outputs from these multiplexers are fed through inverters 92 and 94 respectively to the respective L and R inputs of the adder unit 96. The adder unit 96 provides all arithmetic operations. In addition to the L and R inputs, an additional input is provided from control store word bit 16 (carry inject). The adder 96 output is fed to both the output multiplexer 98 and the input multiplexers/shift logic 80 and 82. The output multiplexer 98 is the main output from the RALU 12. Data from the output multiplexer 98 is provided to the internal bus 28 for distribution throughout the processor.

The following is a further discussion with respect to the processor and operation that is depicted in FIGS. 1 and 2. The central processor is organized around a single internal bus 28 which connects most of the processor logic to each other and to the external bus via receivers 26-R and transmitters 26-T. As indicated hereinbefore, the Y register is the memory address register and the F register 36 is utilized to receive an instruction word during instruction fetches. The various bits on the internal bus 28 are used as inputs to the test logic 50 for use in making firmware branching decisions. The information contained in such various bits from the internal bus 28 can be stored in the test logic 50 and any one of various hardware control flip-flops 54. The internal bus 28 is also an input to the RALU 12.

The internal bus 28 is driven or controlled by several elements including the constant generator 40 which operates under firmware control, the RALU 12, the byte selection register (XB) 32 which is loaded by a shifting from the RALU 12.

The current instruction is dynamically available at the output of the control store 10 and is partially decoded with various logical elements and is then used to provide operations with respect to the remaining elements in the system. The next address generator logic 52 utilizes the next address field in the control store word, i.e. the firmware word and generates a new address dependent thereon and dependent upon test conditions provided by test logic 50. The control store 10 advances to the next address once per processor clock cycle which may be in the order of a few hundred nanoseconds.

Figures 3, 4:
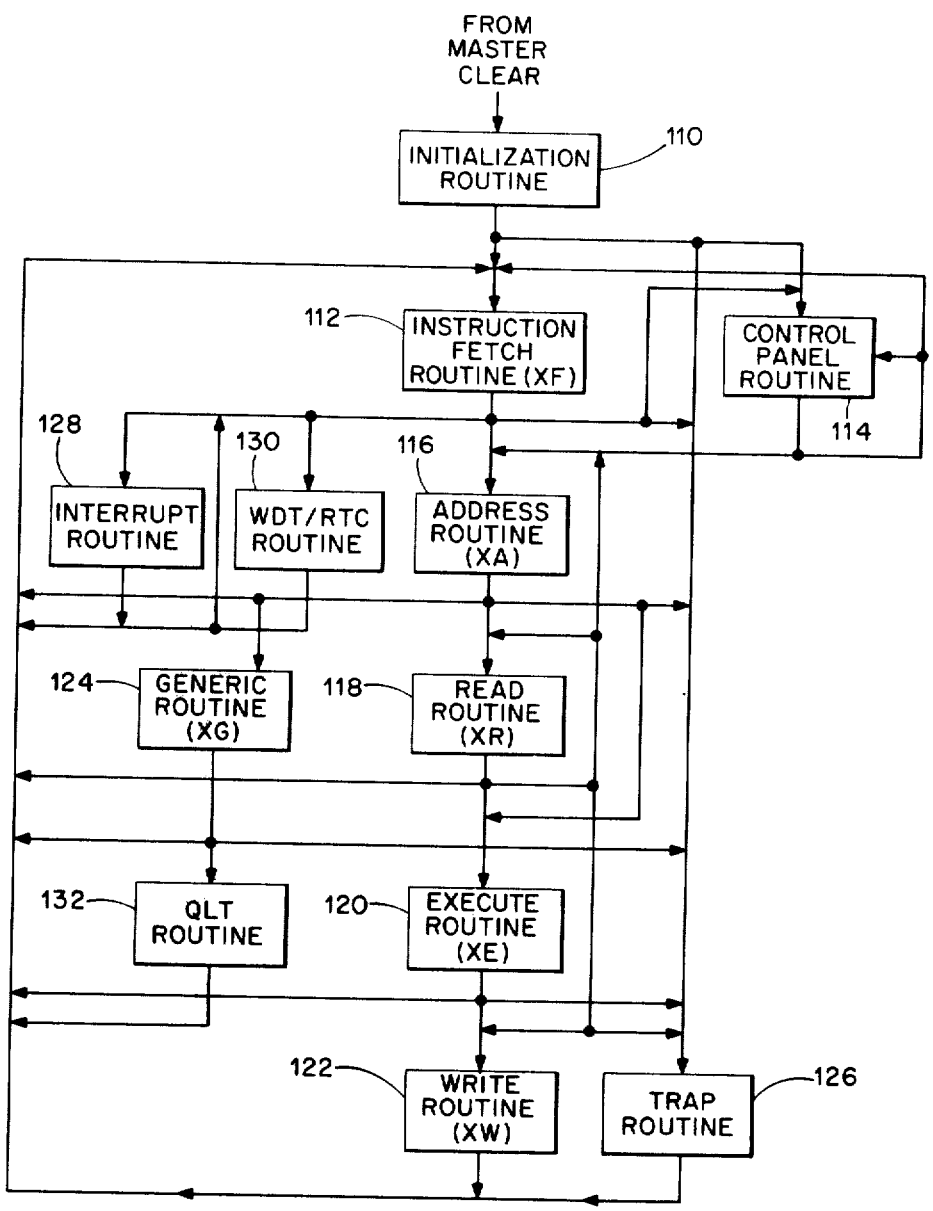
FIG. 3 illustrates in general block diagram form the firmware routines provided in a control store included in the data processor of FIG. 1.
FIG. 4 illustrates the manner in which a firmware and included in such control store is configured.

As shall be further discussed with respect to FIG. 3, branching in the firmware, i.e. the control store is detected by the test logic 50, which uses the contents of the internal status flip-flops 54, the state of the internal bus 28, and the contents of the F register 36 to decide whether any test condition is satisfied or not. This test condition is an input to the next address generator logic as indicated hereinbefore. This test condition also is utilized to select two forms of address generating during various types of branching operations. The XA branch which selects among the entry points in the firmware for the various type of address formations makes a decision based largely upon the contents of the F register 36. The XR branch concerned with fetching operands from memory has its entry points decided to a large extent on the opcode field of the F register 36. By way of further example, the XE branch is based almost exclusively upon the opcode of the instruction and is enabled by the opcode bits of the F register 36. The XW branch which is the branch which decides the manner in which the operand is written back into the memory is performed on the basis of the opcode type and upon the internal status flip-flops 54.

Figure 8:
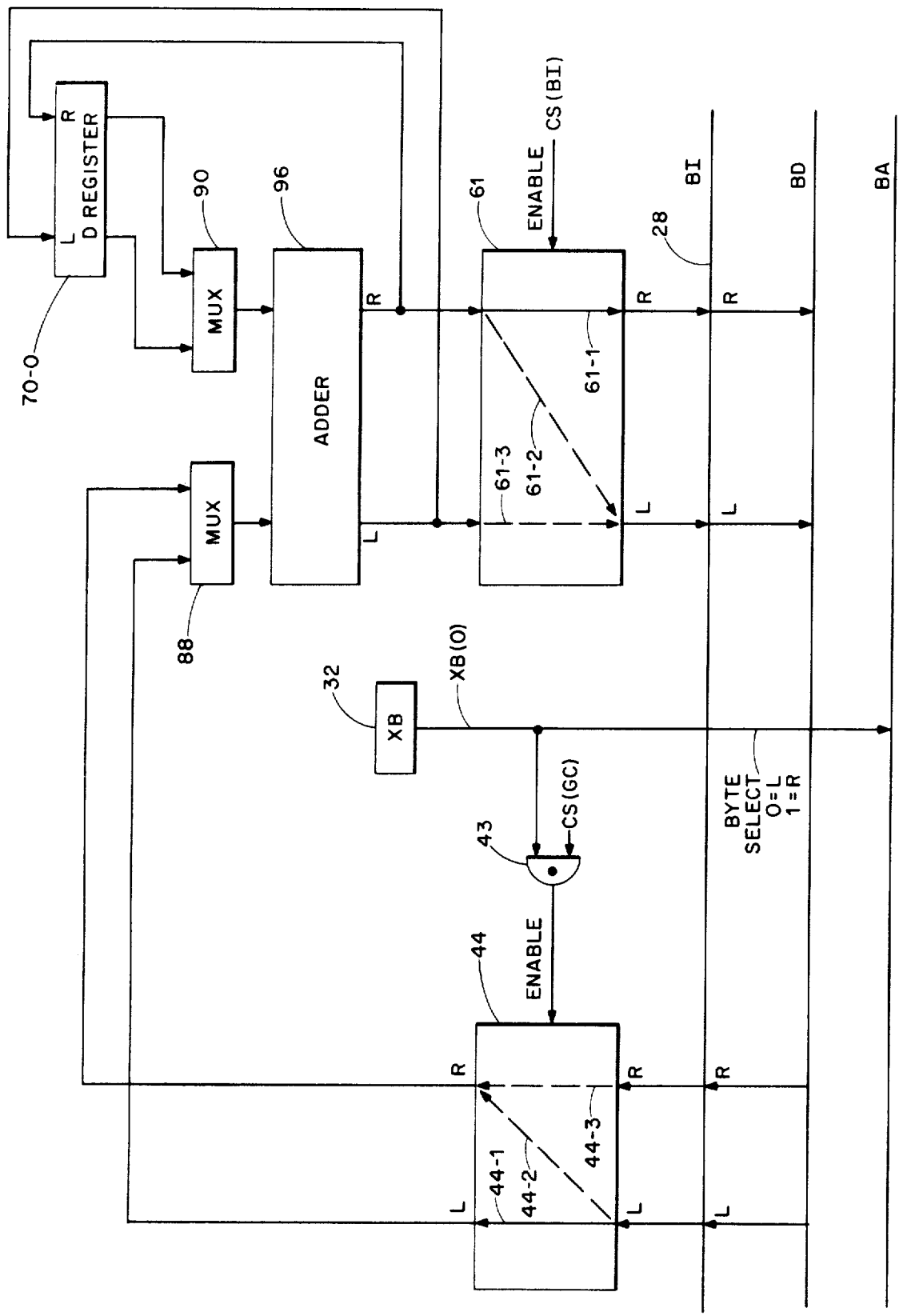
FIG. 8 illustrates the manner in which a single byte of a multi-byte word may be either read or written with memory associated with the data processor of FIG. 1.

As previously indicated, the input to the RALU 12 and the output thereof both have networks which can twin the data input and output from and to the internal bus 28. Using the input twin logic 44, one can either transfer in the 16 bits from the internal bus 28 directly to the RALU 12 or in the alternative, the 8 left hand or most significant bits can be duplicated on both byte positions of a word in the RALU 12. Similarly, there is a twin network 61 on the output of the RALU 12 that will enable the internal bus 28 to be driven from both sides or halves of the RALU output as shown in FIG. 8 by the left and right outputs from adder 96. The right half of the RALU output i.e. the least significant bits may be duplicated on both byte positions of the word as it is transferred to the internal bus 28.

Shifting of the index registers is provided for certain type of addressing and is accomplished by shifting the index value stored in the index register, usually the E register, of the register file 70. During indexing, bits are shifted out either left or right depending on the operation.

The control flip-flops, i.e. the hardware flip-flops 54 which for purposes of decribing the present invention need not be shown in detail, include several flip-flops. One is used to keep track of whether or not the instruction currently being executed is a memory reference instruction or not. Another is used to store the fact of whether or not the output of the RALU 12 as a zero at some previous time.

The F register 36 is actually a 12 bit static register and a 4 bit dynamic counter. The four right hand bits of the F register, i.e. bits 12 through 15 are used as a counter which can be counted down toward zero and whose contents can be tested for use by the next generation address logic. This is used to count shifts, i.e. this is part of the F register 36 which is loaded with the shift distance when a shift is being executed. It is also used for the loops which save and restore the register in memory to count successively through the 16 registers in the register file 70.

The test logic 50 includes a plurality of selectors enabled by various control store and opcode conditions and generally performs those tests which are used with the firmware for making decisions during firmware execution.

Logic 80 and 82 are that portion of the RALU 12 which can either provide i.e. transfer the output of the adder 96 into register file 70 or into Q register 76, or provide the output of the adder 96 shifted one bit to the left or shifted one bit to the right. The logic 80 is coupled directly into the registers in register file 70. If the input to register file 70 is shifted either one bit to the right or one bit to the left, then the appropriate shift input will be provided from the output of adder 96 to supply the missing bit, and the other bit will be transferred out. The E register included in register file 70 is that register which maintains the index values.

Left selector logic 60, right selector logic 62 and the selector modifier logic 58, which includes logic 72 and 74, also comprise part of the control logic of the RALU 12. The output of the selector modifier 58 along with the control store bits zero through 7, determines the output of the left and right selectors 60 and 62, respectively. Control store bits 8 through 15 control the following areas of the RALU 12 logic: Bits 8 through 12 control the adder unit 96 plus the multiplexers and inverters 88, 90, 92 and 94; and bits 13 through 15 control the input and output multiplexers 80, 82 and 98. As indicated hereinbefore, the control store 10 is comprised of a plurality of firmware words for use in controlling various operations within the processor. FIG. 3 provides an overview diagram of such firmware and shows all major branches between the major firmware routines. The following is a general description thereof. More specific details of such firmware with respect to the present invention are provided hereinafter.

The initialization routine 110 is entered following a master clear of the system. This routine clears various ones of the processor registers and flops and determines whether or not the control panel is locked, i.e. whether all control panel switches, etc. are disabled; the control panel being another element which may be included in the processor, but which is not essential to the operation thereof and which is not shown herein. If the control panel is locked, a branch is performed through the instruction fetch routine 112, otherwise the control panel routine 114 is entered. The instruction fetch routine 112 is used to obtain the next instruction for execution. Once the instruction is received from memory, it is loaded into the instruction register (F) 36 and the D register. During the XF routine, checks are performed for the following conditions: (i) recoverable memory error, (ii) watchdog timer or real time clock service required, (iii) device interrupt, or (iv) control panel unlocked. If any of such condition are encountered, a branch is performed for the appropriate routine; otherwise the address routine 116 is entered.

The address routine 116 is primarily used to decode the so-called address syllable portion of the instruction contained in the F register 36. The decode determines whether the next routine is a read routine, an execute routine or a generic routine as hereinafter described. Some instructions, such as shift, are executed entirely within the address routine 116. After executing these instructions, the XF routine 112 is entered to fetch the next instruction.

The read routine 118 calculates the final effective operand address and selects among the various places from which the operand must be obtained. If necessary, the operand is obtained during this routine. Some instructions are executed within the read routine. The execute routine 120 selects one of several subroutines that are used to complete execution of most central processor instructions. The write routine 122 stores the operand or result after the instruction is executed. This routine is entered only when executing instructions that must return the operands to a location specified by an address syllable after execution. Five entry points are available for the write routine, the particular entry point used being based on whether or not the operand is to be transferred to memory or a register, whether the operand is an address operand, and whether it is a half or a full word operand. The generic routine 124 is used to execute several instructions that are not executed by the execute routine. Exemplary of such instructions are the halt instruction, the return from trap condition instruction, or those instructions indicative of the state of the real time clock or watchdog timer.

The trap routine 126 is entered from any one of many locations within the firmware when a trap condition is detected. The interrupt routine 128 is entered from a number of sources depending upon the operation currently being performed by the processor. Such sources may include for example the following: an interrupt caused by the use of the last trap save area or caused by programmed interrupt or caused by an external device received via the external bus or for example by a power failure. The watchdog timer and real time clock routine 130 is entered every several milliseconds (for example every 8.33 milliseconds) if either the watchdog timer or the real time clock is enabled. Also provided as one of the routines is the quality logic test routine 132 which provides a basic confidence test of the processor logic.

Thus, the six major branches, i.e., the XF, XA, XG, XR, XE, and XW branches are in summary used as follows: the XA branch is used when it is necessary to decode the address syllable contained in the F register 36; the XG branch is used when it is necessary to select between individual generic instructions; the XR branch is used to read an operand based on a decode of the F register; the XE branch is used to select among the various subroutines and execute the actual processor instructions; and the XW branch is used when it is necessary to store an operand after execution of the instruction.

The firmware word control format is illustrated in FIG. 4. As can be seen, the firmware word is divided into twelve distinct fields. Each of these fields controls a different portion of the hardware logic as shown in FIGS. 1 and 2 and other figures. The bits comprising the field are also illustrated in FIG. 4. For example, the LS field consists of bits 0 through 3 of the firmware word. The following is a description of each of such fields, and the general use thereof.

The LS field is used to select one of the 16 registers 70 in the RALU 12. The selection so performed by the LS field is subject to modification by the selector modifier field (SM). The LS field is used only during read operations. The right select field (RS) is used as is the LS field, selecting the same register or another one of the 16 RALU registers 70. The RS field however is used for both read and write operations. The AFC and AF fields are used in combination and provide the necessary decode for controlling all operations within the arithmetic logic unit or adder 96. The AM field controls the output multiplexers 98 thereby controlling all data movement and shift operations within the RALU 12.

The GC field controls various hardware operations which are classified into three groups. The particular group selected is determined by a decode of bits 17 and 18 of the AC field. The first group controls operations associated with the P register 20, the I register 16, and the F register 36. The second group controls operations associated with the twinning logic, i.e. logic 44 and 61, the S register 14, the M1 register 18, the XB register 32, the watchdog timer and the real time clock, and the various hardware control flops 54. The third group is utilized in association with operation of the control panel.

The selector modifier (SM) field in addition to including bits 24 and 25 of the firmware word also utilizes bits 20 thereof which is included in the GC field. If the two SM bits are both equal to zero indicating that they are not used, then the selection performed by the LS and RS fields is not affected. If however the SM bits 24 and 25 are used, i.e. they are not equal to zero, then the specific bits of the F register 36 are logically anded with both the input of the LS and RS fields which is in turn used for register file selection. The internal bus control field (BI) is used to transmit information onto the internal bus. The external bus control field (BS) is utilized to control the central processor's use of the external bus. The branch type field (BR) determines the type of branch performed as a result of a specific test condition. The test condition field (TC) determines the specific test condition that is used in conjunction with the branch type field. The next address field (NA) defines the next sequential firmware word address in control store 10.

Figure 5:
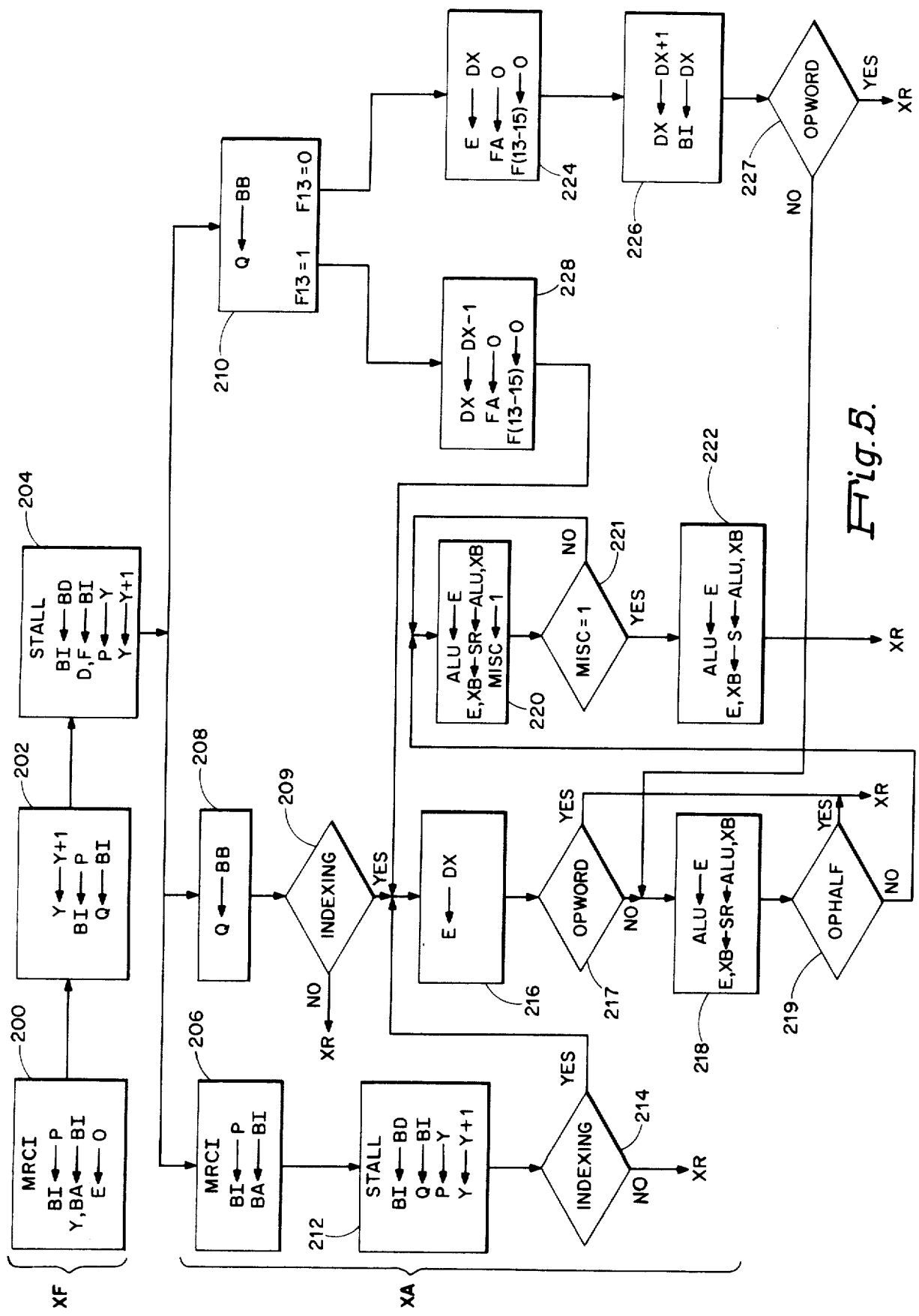
FIGS. 5 and 6 illustrate in detail the manner in which individual firmware words control the operation of the present invention in association with the control store and processor of FIG. 1.

The following is a detailed description of the instruction fetch routine 112 and the address routine 116. With reference to FIG. 5, the instruction fetch routine includes blocks 200, 202 and 204. The remaining blocks in FIG. 5 represent a portion of the XA routine. Each of the rectangular blocks shown in FIG. 5 represents the operation provided in response to a firmware word from control store 10. The decision boxes are actually included as a part of the immediately preceding rectangular box but have been shown separately for ease of understanding. Various registers are utilized in the XF and XA routines. The following is a general description of such registers, some of which discussion may be repeated for purpose of convenience. The P register 20, i.e., the program counter, contains the address of the instruction currently being executed. The output of program counter 20 is coupled to the internal bus 28. The Y register 22 is the memory address register and temporarily contains the address of the next instruction to be executed. The E register contained in the register file 70 in the RALU 12 is a working register that is used for manipulating data during firmware operations. During indexed operations, the E register includes the index value. The Q register 76 is also included in the RALU 12 and is provided for double operand shifts and typically includes the unindexed address. The F register 36 is the instruction register and holds the instruction word as it is received from memory. The D register is included in the register file 70 and is a working register, i.e., is used for manipulating data, as is the E register. The XB register 32 is a four bit register that is used for bit and byte indexing within the processor. The output of this register is coupled to the internal bus 28 and the decoder logic 34. Other elements will be generally described during the following discussion.

Now with reference to the instruction fetch routine, i.e., the XF routine, in response to the firmware word indicated by block 200, following a memory read cycle initiate (MRCI), the contents of the program counter 20 are loaded via the internal bus 28 into the memory address register, i.e., the Y register 22 and onto the address portion of the external bus (BA). Meanwhile, the E register is cleared to include all zeroes. When the firmware operation represented by block 200 is complete, block 202 is entered. It should be noted that typically there are tests performed between various firmware word executions. For example, at the conclusion of the firmware operation represented by block 200, block 202 will not be entered if for example there is a watchdog timer service request in which event such request would be serviced. Assuming however that block 202 is entered, the Y register, i.e. the memory address register 22 is incremented by one, and the contents of the program counter 20 are placed in the Q register 76 by means of the internal bus (BI) 28. Thus in summary, the operation provided by firmware words 200 and 202, the memory read cycle is initiated to fetch an instruction from memory, and the instruction address is transferred from the P register, i.e. the program counter 20 to the memory address register 22 following which the memory address register is incremented and the Q register is loaded with the instruction address from the P register 20. Upon receipt of the data from the memory, the operation indicated in block 204 will be provided. As indicated in block 204, there will be no operation until the data is so received. This is indicated by the word STALL. The data is returned on the data line (BD) of the external bus and is directly received by the internal bus and in turn is placed in the D register in the RALU 12 and in the F register 36. Thus the F register 36 includes the instruction word received from memory. The address of the next instruction to be executed as indicated in the Y register, is then transferred into the program counter 20. Following the transfer of the contents of the memory address register 22 to the program counter, the Y register 22 is incremented by one. At this point, the address routine 116 will be entered.

By way of example, and with reference to the firmware words represented by blocks 200, 202 and 204, assuming that the program counter 20 address is location 100 in memory, after the operation indicated in block 200, the Y register will also indicate location 100. By the operation provided by the firmware word represented by block 202, the memory address register 22 is incremented to point to the next address of the next instruction to be executed whereas the address in the P counter remains at 100. Thus, the Y register 22 includes the address 101. During the operation provided for in block 204, the contents of the Y register are transferred to the P register and the Y register is again incremented and accordingly the P register points to address 101 which is the address of the next word of the current procedure, and the Y register address points to the next address, namely address 102.

Continuing with reference to FIG. 5, following the instruction fetch routine 112, the address routine (XA) 116 is entered. There are different types of address formations which may result dependent primarily upon the instruction contained in the F register 36. Included in this are global addressing, base addressing, indexed addressing combined with either global or base addressing, base plus indexed push-pop addressing. Included in the indexed addressing is the manner in which word, byte or bits may be individually addressed in memory. Generally, indexed addressing is utilized when it is required to refer to data or an address within an array of homogeneously sized elements. Indirect addressing is used when it is desirable to refer to a location whose address is stored in another location. So-called relative addressing is that addressing which utilizes the program counter 20 for addressing of memory, whereas base addressing utilizes a base register included in the register file 70 of RALU 12 to provide addressing of memory. Various types and combinations of addressing are further discussed in a December, 1975 publication of Honeywell Information Systems Inc. entitled, "Series 60 (Level 6) Assembly Language GCOS/BES," order number AS31.

With reference to FIG. 5, the path beginning with block 206 provides the operation with respect to either global or global plus indexed addressing; the block 208 provides the starting point for base or base plus indexed addressing; and the block 210 provides the starting point for base plus index push or pop addressing. With reference to global or global plus indexed addressing, and with reference to the operation beginning at block 206, such global addressing may be utilized for those situations in which it is desirable to reference data or an address that is unrelated to the current location addressed. This form of addressing allows one to reference a location directly or indirectly. Thus with reference to block 206, the contents of the program counter 20, i.e. the address following the instruction being currently executed and by way of the above example, address 101, is placed on the internal bus 28 and finally on the address lines of the external bus. As also indicated in block 206, a memory reference cycle is also initiated, but block or firmware word 212 operation is not provided until after receiving the addressed word from memory as indicated by the indication of stall in block 212. The word from memory is received from the data lines of the external bus and placed into the Q register via the internal bus 28. The Q register 76 as will be recalled may include the unindexed address. The contents of the memory address register, i.e. the Y register 22 is then placed into the P counter 20 and accordingly address 102 is now in the P counter. Thus because of the memory reference cycle initiate, by the firmware operation indicated by block 212, the operand address is received from memory and stored in the Q register, and accordingly the Q register includes the unindexed address of the operand. Following the transfer of the content of the Y register to the P counter, the memory address register 22 is incremented by one and accordingly such register, i.e. the Y register 22 has by way of example address 103 included therein. Also part of the operation provided by block 212 is a determination of whether or not indexing is required. If there is no indexing required, as indicated by examination of the instruction in the F register 36, then the read routine (XR) 118 is entered. If indexing is required as indicated by block 214, then an indexing sequence is entered. This indexing sequence is the same as that provided for base indexing operations. This shall be discussed with reference to such base indexing hereinafter.

With reference to block 208, the firmware word represented thereby causes the current address to be transferred from the specified base register (BB) in register file 70 to the Q register 76. Also during the operation provided by such firmware word, a determination is made as to whether or not indexing is required as indicated by block 209. If there was no indexing required, then the read routine is entered directly. If indexing is required, then the firmware word represented by block 216 is entered. It is noted that block 216 is entered also from the yes indication of block 214 and also from that indicated in the path beginning with the firmware word represented by block 210.

If indexing is required, then the firmware word represented by block 216 is executed. Thus the contents of the selected index register (DX), it being noted that there may be three index registers, namely data registers D1, D2 and D3, are loaded into the E register. In addition, it is determined whether or not the operation is a word operation or not. If it is not a word operation, it will either be a half word (i.e., byte operation) or a bit operation. If the location to be addressed is a word location and accordingly a full word is to be accessed, for reading or writing in the memory, then block 217, i.e. part of the firmware word represented by block 216, will exit to the XR routine 118. The XR routine will then cause the word to be read from memory. If this is not a word operation, then block 217 will indicate a no condition and block 218 will be entered. The firmware word represented by block 218 will cause the contents of the E register in register file 70 of RALU 12 to be transferred to the adder 96 and will cause the contents of the E register to be shifted right by one into the XB register 32. Thus the operation of the firmware word represented by block 218 does such right shifting by one bit of the E register into the XB register by first shifting the contents of the E register into the adder 96 and then shifting the contents of the XB register and the adder 96 such that a right shift by one is accomplished. This is represented by the second line or statement in block 218.

If the operation is a byte or half word operation, then block 219, i.e., part of the firmware word represented by block 218, is exited to the read routine 118. If it is not to be a half word operation, and since it was not a word operation, it must be a bit operation and the no answer of block 219 is exited into block 220, and the operation provided by such firmware word is commenced. Accordingly, in order to be able to address a bit, four full right shifts must be provided in order to transfer four bits to the XB register 32. Since one right shift has already been accomplished, then the blocks including 220 and thereafter are provided in order to execute three additional shifts. The contents of the E register are again shifted into the ALU or adder 96 and the right shift is executed. As indicated hereinbefore, the decision box following the firmware word box is a part of such firmware word box and in this case, a question of whether or not the MISC flip-flop is equal to one, is questioned in box 221. Since this flip-flop, as is the case for most status flip-flops has been cleared previously, the answer will be no and block 220 will again be entered, however during the first operation provided by block 220, such MISC flip-flop will be set to a one. The right shift is again provided by the firmware operation indicated in block 220 and in this case the answer to block 221 will be yes. In fact, the MISC flip-flop had been set. Accordingly, the firmware word represented by block 222 is entered and again a right shift operation takes place. Following this there have been four right shifts and accordingly the read routine is entered. As shall be described more fully hereinafter, the contents, i.e. the four bits in the XB register 32, are then decoded by decoder 34. The decoded output is utilized to provide the bit addressing as required.

The XA routine also provides the capability of base register indexed push-pop addressing. For indexed base relative push addressing, a decrement of the contents of the specified index register by one occurs and then a computation of the effective address of the data to be used. For indexed base relative pop addressing, there is provided a computation of the effective address of the location or data to be used in the operation. After computing such effective address, the contents of the index register are incremented by one. The difference between push and pop addressing is determined by bit 13 of the F register 36. Thus, in this operation, block 210 is entered and the Q register 76 is loaded with the contents of the specified base register (BB). If this is to be an indexed pop operation, block 224 is entered and the operation provided by the firmware represented thereby is executed. Accordingly, the E register is loaded with the contents of the selected index register and the indirect addressing bit (FA), i.e. bit 12 of the F register, is cleared. Bits 13 through 15 of the F register, which represent the base register number are also cleared. Block 226 and the operation indicated therein is then entered and accordingly the selected index register is incremented by one. A decision is made as indicated in block 227 as to whether or not the addressing is for a full word. If so, the read routine is entered. If not, then block 218 is entered and a shift operation into the XB register is performed and further indexing is also provided as indicated hereinbefore.

Thus for the base indexed pop operation, indexing will be provided by word, byte or bit when block 224 is entered. If on the other hand this is a base plus index push operation, block 228 will be entered and the contents of the selected index register (DX) will be decremented by one following which the clearing occurs as was the case for the firmware word represented by block 224. Block 228 is exited into the input of block 216 and the indexing operation begins. The indexing operation is indicated as described hereinbefore. Thus it can be seen that based on the address routine, the Q register 76 will include the unindexed address and if there is indexing, the E register will include the index. Other types of address subroutines are also provided in the system which subroutines are not pertinent to the system of the present invention.

Figure 6:
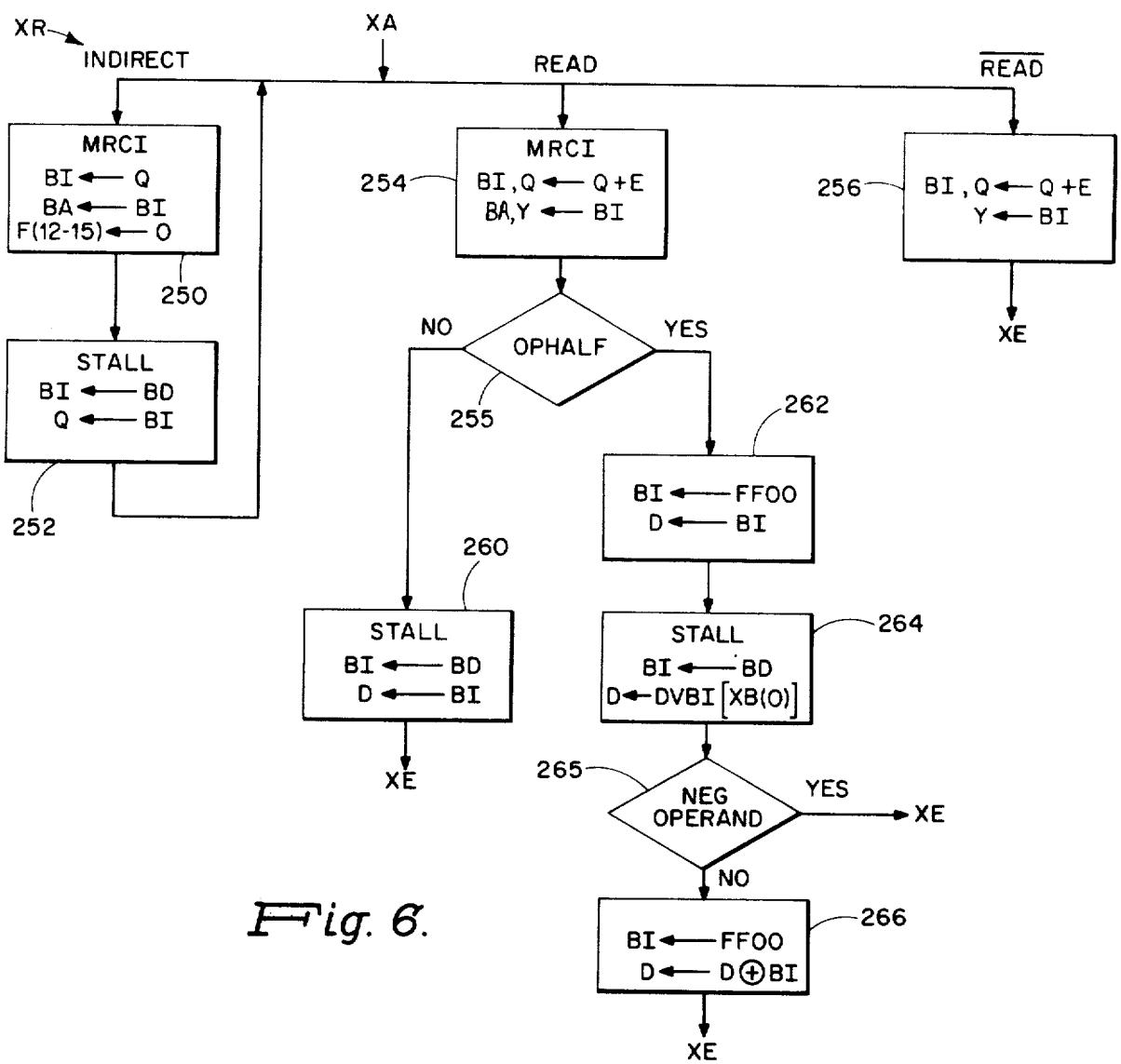

Now with reference to FIG. 6, pertinent portions of the read routine (XR) 118 will be discussed in further detail. Upon entering the XR routine, various subroutines thereof may be performed dependent upon the opcode of for example the register 36 contents. For example, if bit 12 (FA) of the F register, i.e. the indirect addressing bit, is set to a binary one, then block 250 will be entered and the firmware operation represented thereby will be executed. The memory read cycle will be initiated and in so doing, the Q register 76 which includes the unindexed address of the operand will be transferred to the address lines of the external bus via and internal bus 28 and thereafter the F register bits 12 to 15 will be cleared. Upon receipt of the address word as indicated by the stall in block 252, the received word will be transferred from the data lines of the external bus via the internal bus 28 into the Q register 76 of the RALU 12. Thus the operand address will now be stored in the Q register and the read routine will be reentered. Typically, upon reentering, either a READ operation or a not read (READ) operation will take place. The read operation is indicated by the firmware words starting with that firmware word represented by block 254 whereas the not read operation is that indicated by block 256. Upon completion of either the read operation or not read operation, the execute routine 120 is entered.

With reference to the read subroutine of the read routine 118, the memory read cycle is initiated as indicated by the firmware word represented by block 254. This is done by providing the sum of the contents of the Q register which is the unindexed address and the contents of the E register which is the index value back into the Q register via the internal bus 28 into the Y register 22. Thus the Y register, i.e. the memory address register 22, now includes the address of the operand to be extracted, such address being an indexed address. Also during such firmware word represented by block 254, a determination is made as to whether or not the operation is a half word operation as indicated by the decision box 255. If it is not a half word operation, block 260 is entered. When data is received from the memory via the data lines (BD) it is placed via the internal bus 28 into the D register. Thus by the firmware operation represented by block 260, the operand, i.e., the data to be operated upon, is now in the data register (D). Such data will be processed either without masking where a full word is to be operated upon or with masking provided by the index value in the E register where only a bit is to be operated on. The execute routine is then entered during which such word or bit operation as appliable will be executed.

If there is to be half word operation as indicated by the decision box 255, then block 262 is entered. Initially, the D register, via the internal bus 28, is loaded with the constant FFOO. FFOO is a bit pattern of eight binary ones followed by eight binary zeroes and is used for left and right byte selection. If XB(O) is a binary zero, the left byte received from memory on the data line (BD) will be duplicated on both the left and right byte lines; whereas if XB(O) is a binary one, the right and left bytes are transferred without duplication. By placing the FFOO bit pattern in the D register, sign extension of a negative (binary one indication) operand is provided in the leftmost eight bits, with the left or right byte, depending upon the state of XB(O), placed in the rightmost eight bits of the D register. Sign extension is needed to allow adder 96 to use only the leftmost bit of a word to efficiently determine the operand's sign. Thus as indicated in the firmware word represented by block 264, once data is received from the data lines of the external bus, it is placed in the D register. Thus, the operand, i.e. the half word, is received from memory and stored in the D register. A determination is also made as indicated in block 265 as to whether or not this is a negative operand. If it is a negative operand, then the execute routine is entered directly. If it is not a negative operand, then the firmware word represented by block 266 is entered and the operand in the D register is exclusively ORed with FFOO so that all binary zeroes are thereby placed in the eight leftmost bits of the D register, it being noted that exclusively ORing two binary ones gives a binary zero. The execute routine is then entered.

The not read subroutine is entered dependent upon the opcode in the F register. The firmware word represented by block 256 provides that the unindexed address in the Q register and the index value in the E register and added together and placed back in the Q register and via the internal bus 28 into the memory address register 22. The execute routine is then entered.

In summary, the address formation, i.e. the steps in the operand address creation, follows the fetch routine execution by which the P and Y registers include the proper addresses, the E register is cleared to zero, the instruction address is loaded into the Q register from the P register and the instruction has been loaded from the memory into the D and F registers. The instruction is now operated upon during the address routine 116. The first basic step is to transfer the unindexed address into the Q register 76. If there is to be indexing, then the next step is to move the index value (leaving zero if there is no indexing) into the E register in register file 70. The next step if this is not a word operation but is rather a byte or bit operation is to shift the indexed value in the E register into the XB register 32. There will be only one shift if this is a byte address operation and there will be a total of four bits shifted if this is a bit addressing operation. The one bit will allow selection between two bytes in a word and the four bits will allow selection of any one of 16 bits in a word. This completes the operation of the address routine 116, following which the read routine (XR) 118 is entered.

During the XR routine, indirect addressing is provided, if needed, by use of the Q register. Next, the contents of the Q and E registers are added to create the final effective word, byte, or bit address. The next step is to read from memory the data addressed and use the contents of the XB register to steer the data into the RALU 12. For word operations, the word is read from memory and is received by the RALU 12 without use of the XB register.

Thus following the fetch routine, the address routine portion which is of primary concern provides for the centralization of the unindexed effective address in the Q register, and the centralization of the index value in the E register, followed by the shifting operations if this is not a word operation. This is followed by the read routine by which a first subroutine insures that the effective address in the Q register is the actual or final address and that there is no indirect addressing involved. If indirect addressing is required this is provided for, thereby placing such final address in the Q register.

Figure 7:
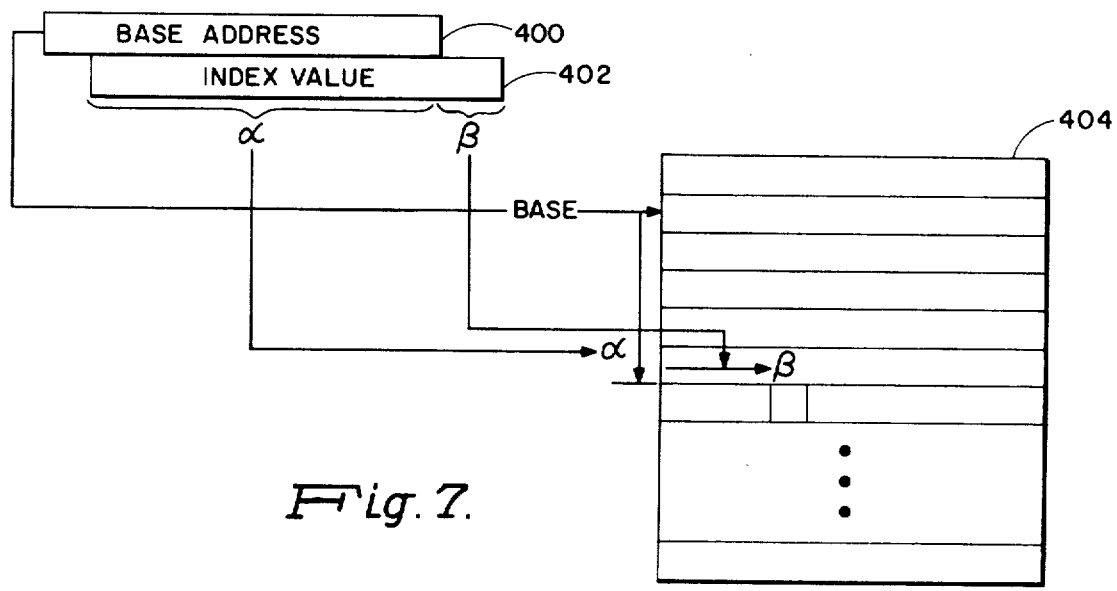
FIG. 7 illustrates by general block diagram the manner in which words, bytes or bits may be effectively addressed in a memory associated with the data processor of FIG. 1.

Now referring to FIG. 7, the manner in which a byte or a bit is addressed is further illustrated. The base address 400 is unindexed and is normally included in the Q register 76. The index value 402 is normally provided in the E register included in register file 70. Depending upon whether there is a byte or bit operation, the contents of the E register are shifted into the XB register once if it is a byte operation or four times if it is a bit operation that is involved. If it is simply a word to be addressed, there is no shift. The value which is shifted into the XB register 32 is that designated beta, and the "word" portion of any indexing from the base address is that indicated by alpha in the index value 402, which alpha value is in the E register. Accordingly, the base address 400 addresses the storage device 404 at the location indicated by such base address, the alpha index value provides the word indexing to a word location, and the beta indexing value provides indexing either to the left byte or the right byte of the addressed word depending upon the single shifted bit in the XB register 32 or the beta index value provides indexing to one of for example 16 bits of the addressed word if the beta value shifted into XB register is four bits in length. It should be understood that the above described indexing operation may be utilized for operations involving two or more words by using such indexing technique to provide left shift(s) of the index value rather than right shift(s) as shown.

With reference to FIG. 8, the manner in which a byte contained in a word is written into or read from memory shall be explained. The interface to the memory from the processor is via the internal bus 28 which couples to the external bus, which is comprised of data lines (BD) and address lines (BA). The external bus also includes control lines as shown in FIG. 1. The input and output twinning logic are shown respectively as elements 44 and 61. The D register in the register file 70 is shown coupled with the adder 96 of the RALU 12 via multiplexer 90, although it could have been coupled via multiplexer 88. XB register 32 is also shown coupled with the twinning logic 44 as well as the address lines of the external bus. For full word read or write operations, the data transfers are left to blocks 44 and 61, the word paths are for the right byte path 61-1 and for the left byte path 61-3. For read operations, and as depicted in multiplexer 44, the left path 44-1 is used and the right path 4403 is used.

For half word write operations, in response to the BI field of the firmware word, the byte to be written is received from the right output of adder 96 and is provided not only on the right byte path via path 61-1 in multiplexer 61 but also in the left byte position via path 61-2 in the multiplexer 61. The left byte received from adder 96 will not be placed on the internal bus 28. Accordingly, the external bus will receive the same byte on both byte position of the word lines.

For half word read operations, the data is received from the data line (BD) of the external bus by the multiplexer 44. If bit XB(O) is a binary zero, then the left byte of the word is duplicated on both the left and right inputs to adder 96. This is accomplished via multiplexer 44 by use of paths 44-1 and 44-2, with path 44-2 being used in place of path 44-3 (which path 44-3 would have been used if XB(O) was a binary one). Accordingly, the right byte received from the data line of the external bus is not used. Upon reading, these bytes are processed by the adder 96 via the multiplexer 88 and placed into the appropriate byte location in D register 70-0.

Now referring to FIG. 9, the logic of FIGS. 1 and 2 are shown in more detail with respect to illustrating the manner in which shift or indexing operations are performed. During indexing operations, the index value is placed in the E register which is included in the register file 70. The opcode in the F register 36 is then tested to see whether or not this is a full word or a non-full word operation. A non-full word operation would imply either a byte or a bit operation. If it is a full word instruction, then the indexing is already correctly aligned, and no further operation is required with respect to indexing. If it is half-word or bit instruction, it is necessary to shift the index value one or more times. The shifting is provided by means of the RALU 12 and the contents of the E register are extracted via the R latch 86. The output from the E register is then passed through the multiplexer 90 and via the adder 96 back into shift logic 80 where it is shifted right and then back into the E register again. One bit position is shifted for each processor clock cycle. No further shifts are required if this is a byte operation. At the same time that the shifting operation takes place, the most significant bit of the E register, i.e. the bit which indicates the sign of the contents of the index value, is provided via multiplexer 98 and logic 61 to the internal bus 28. By doing this, this bit zero of the E register will be available as a shift input to selector 37 which includes other inputs which are not relevant to the present invention. The input selected depends on the opcode of F register 36 as well as the AM field of the control store word or firmware word. Bit zero of the E register is than enabled via gate 39 in response also to the AM field of the control store word as an input to the shift logic so as to provide the shift input thereof a sign extension, i.e., the same bit which was previously in bit zero which indicates that the sign remains the same even after the shift in the E register. Thus, the sign extension is provided in the left-hand bits which are vacated during the shift operations thereby maintaining the proper sign for the index value. Thus, the direction of displacement indicated by the index value in the E register will remain consistent.

The bit which is shifted to the right during the shift of the E register is provided as an input to the XB register 32 into bit position XB (O). The control store field GC enables the XB register to shift to the right during the shift of the E register so that the shifted bit is captured in bit position XB (O) for subsequent use in selecting right byte versus left byte when a word has been fetched from memory. As indicated previously, after this one bit shift, the opcode in the F register 36 is tested by means of the test logic 50 to determine whether it is a byte or a bit operation. If it is a bit opcode, then the shift operation is performed three more times. Each time this is done, the E register sign is shifted or extended one bit further and the shifting of the successive bits in the E register occurs as indicated hereinbefore and is provided successively via position XB (O) into the remaining three positions of the XB register 32 so that what was previously in bit position XB (O) is now in bit position XB (3), etc. Thus, the rightmost bit or most significant bit 15 in the E register for bit operations is finally transferred and placed inposition SB (3), bit 14 is placed in position XB (2), etc.

The use of the information which has been placed in the XB register 32 is as follows. For half-word read operations, the XB register 32 includes one bit in the XB (O) position. This indicates whether the byte selector has selected the left byte or the right byte in the word that is to be addressed in memory, a binary zero indicating left and a binary one indicating right. During half-word read operations, this bit is used to control logic 44 by means of gate 43 which includes an enabling input from the GC field of the control store word. A word is read from memory using the sum of the address plus the index value in the E register. The returning word is an input to the multiplexer, i.e. input twin logic 44. As previously indicated, if XB (0) is a binary zero, then the left-half of the data at the input of this multiplexer is copied onto both halves of the output and thus into both halves of the input of the adder 96. If XB (0) is a binary one, then the data passes left to left and right to right without duplication. The data is then placed in the D register in register file 70, such D register being the operand register for all memory reference instructions.

During half-word write operations, the D register in register file 70 which contains the data to be written, is enabled under the control of the control store via the adder 96 with multiplexer 98 into output twinning logic 61. Logic 61 is controlled by the BI field of the firmware word and will cause in this particular type of operation the right-hand half of the word to be copied onto both halves of the internal bus (BI) 28, and thus be enabled to the data bus (BA) for writing into memory. At the same time, the control store 10 via the gate 51 allows the bit in bit position XB (0) of the XB register 32 to be emitted to the memory on one of the address lines (BA) of the external bus as the least significant bit to signify the half-word select bit of the address bus. When XB (0) is a binary zero, this indicates that the left-half of the data bus is to be copied onto the left-half of the memory word and when a binary one, this indicates that the right-half of the data bus is to be copied to the right-half of the memory word. Thus, XB (0) on write operation controls which half of the data word the correct byte is written into.

During bit operations, the contents of the XB register are used in a different manner. During indexed bit operations (i.e., the opcode in the F register 36 indicates a bit operation), then the XB register would have been shifted four times thereby providing four bits to indicate which of 16 bits is to be operated upon. These four bits in the XB register 32 are provided to decoder 34 which generates a mask of 16 bits, such mask including 15 binary zeroes and one binary one or vice-versa depending upon the logic polarity in the system, thereby enabling operation only on that bit location which is differently masked from the other locations. The output of decoder 34 is enabled onto the internal bus 28 in response to the BI field of the control store firmware word via gates 41. This mask is then provided into the adder 96 via logic 44 and multiplexer 88. The mask is then placed in the E register in register file 70 for purposes of this indexed operation. The contents of the E register are then used to operate on the appropriate bit of the operand word. This is accomplished during the XE cycle by masking the contents or mask row in the E register with the operand word received from memory (see block 260 in FIG. 6). This masking operation is similar to the masking provided by value FF00 as explained with reference to blocks 262 and 264 of FIG. 6.

It should be noted that in addition to providing XB (0) onto the address lines of the external bus via gate 51, that the contents of Y register 22 are also placed thereon for addressing the memory. By way of further note, the Y register 22 always includes the last address which was sent to the address lines and accordingly any time an address is provided onto the address lines, such address is also provided to the Y register 22.

Figure 10:
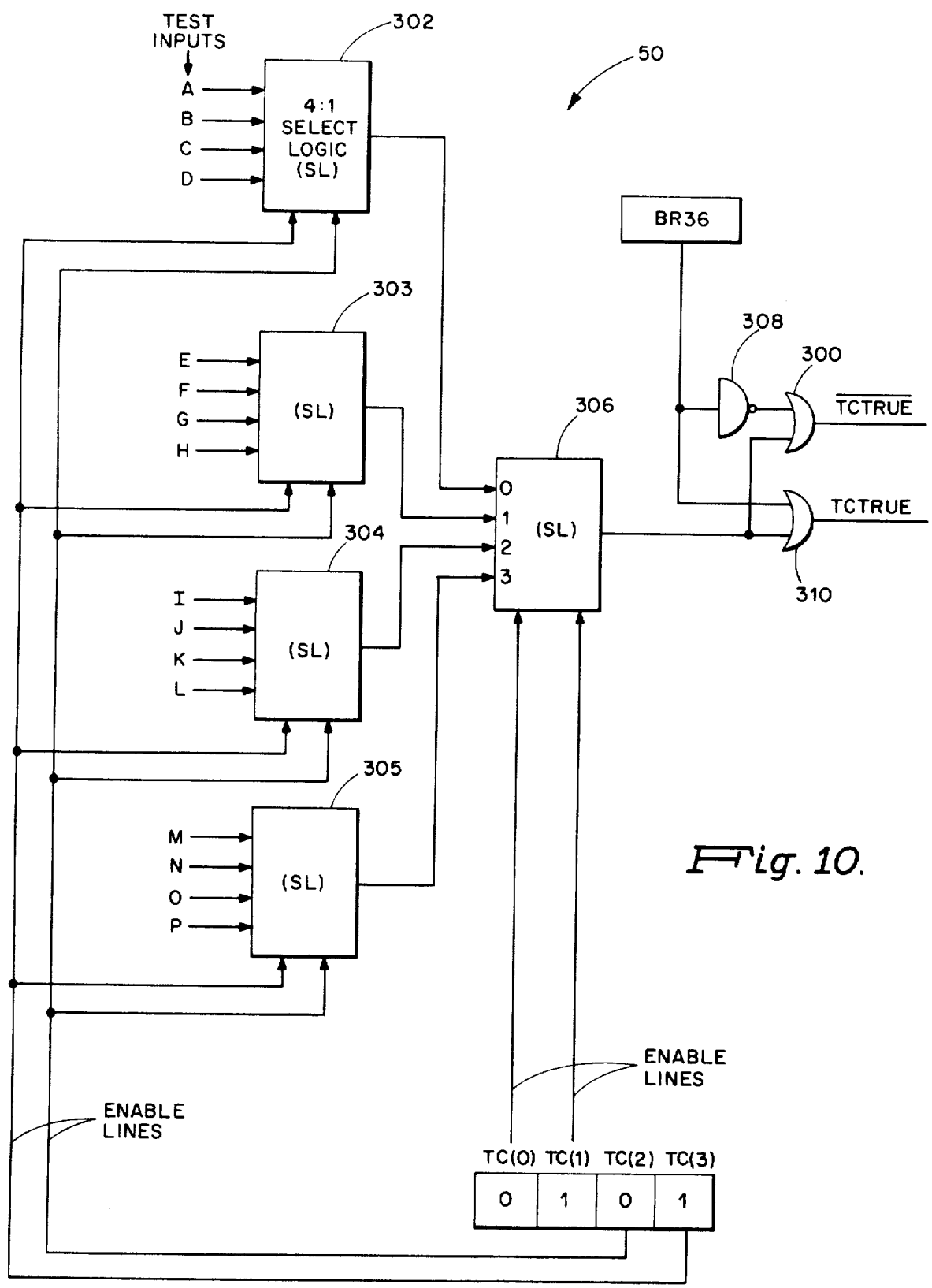
FIG. 10 illustrates a detailed block diagram of the test logic included in the data processor of FIG. 1.

Now referring to FIG. 10, there is shown the test logic 50. Test logic 50 is responsive to the TC field in the firmware word. As indicated in FIG. 4, the TC field may include by way of example six bits 40 through 45. Accordingly, 64 test conditions may be selected. For ease of illustration, the test logic of FIG. 10 illustrates the selection of up to 16 test inputs and accordingly is shown to be controlled by four bits in TC field. This logic 50 comprises selector logic or decode logic so as to provide one of the test inputs at the output of selector logic (SL) 306. The logic 306 provides an input to various gates which are controlled by bit 36 of the BR field in the firmware word. Basically, this provides a means for inverting the selected signal depending upon which operation is desired. For example with one of the test inputs coming from one of the bits in the F register, it can be determined what a bit in the instruction word indicates in the way of the operation to be performed. However, this operation may be different under some circumstances; thus such inversion allows the generation of either the TCTRUE or TCTRUE signal, which enable different addressing as shall be seen when discussing the next address generation logic of FIG. 11.

Test logic 50 as indicated earlier includes selection logic. Typical selection logic or decoders may include the ability to provide any one of four inputs to the output thereof by means of signals received on two enable lines. Other combinations and arrangements of such selection logic may be configured without departing from the scope of the invention. Each of the selection logic 302 through 306 may be of the same type as illustrated. Thus, four test inputs A through D are received by selection logic 302 and test inputs E through P are received at the inputs respectively of selection logic 303, 304 and 305, while the outputs of such four mentioned selection logic are provided at the input of the selection logic 306.

Signals TC2 and TC3 will enable the selection logic 302 through 305 to pass one test input each to one input of selection logic 306. Signals TC0 and TC1 will enable one of the four inputs of selection logic 306 into the input of the gating network. By way of example, if signals TC0 through TC3 are respectively a binary zero, one, zero and one, then, the contents of the third input, namely inputs C, G, K and O to selection logic 302, 303, 304 and 305 respectively will be passed to the inputs of selection logic 306. In turn, selection logic 306 will be enabled to pass one input to the output thereof, i.e. test input K will be received by the exclusive or gates 300 and 310.

Upon receipt of a test input, and depending upon the BR field (bit 36) of the firmware word, either signal TCTRUE or TCTRUE will be generated. With a binary one at the input of exclusive or gates 300 and 310, a binary one will be generated at the output of gate 310 and accordingly generate the signal TCTRUE if the BR 36 signal is a binary one. If the BR 36 signal is a binary zero, gate 300 will be enabled via inverter 308 to generate a binary one signal, i.e. signal TCTRUE.

Figure 11:
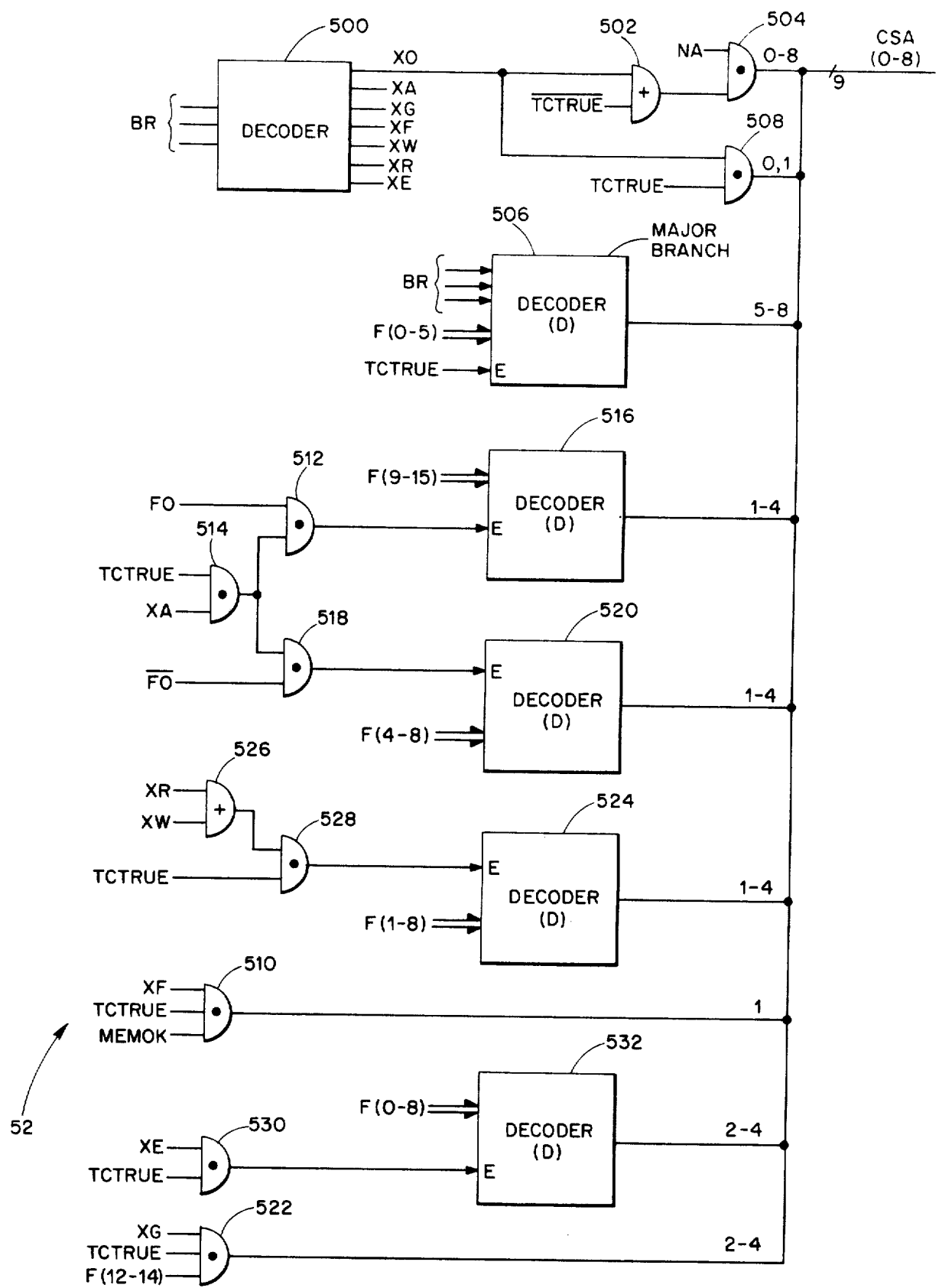
FIG. 11 illustrates a detailed block diagram of the next address generation logic of the data processor shown in FIG. 1.

Now referring to FIG. 11, the next address generation logic 52 is shown in detail. Next address generation logic 52 is provided to enable the addressing of the control store 10 via the 9 CSA lines (0 through 8). By way of example only 512 words are used in control store 10, accordingly the tenth or more CSA lines do not need to be discussed. The address pattern which is included on the CSA lines depends upon a number of inputs to next address generation logic 52. One of such inputs is from the test logic 50, which provides either the TCTRUE or TCTRUE signal. Other inputs are typically provided from the F register 36 and the last addressed control store word. The primary field from the control store word is the NA field which is used in all cases when the test condition is false TCTRUE.

The nine control store address bits are provided in order to address firmware words associated with the various firmware routines as depicted in FIG. 3. Typically, each such routine, i.e. group of firmware words, is included in a dedicated area in the control store 10. The control store input to the next address generation logic includes the BR field in the firmware word which determines the type of branch performed as a result of a specific test condition. The F register holds the instruction word as it is received from memory. This is a 16 bit register. As can be seen from FIG. 11, various combinations of such bits are used. The instruction word typically includes a format as follows: bits 4 through 8 include the so-called opcode field and bits 9 through 15 include the so-called address syllable. The so-called address syllable may include in bits 9 through 11 thereof an address modifier. Bit 12 of such address syllable is a so-called indirect addressing indicator bit, whereas bits 13 through 15 include the register number i.e. any one of base registers B1 through B7 in register file 70 of the RALU 12. Bits 1 through 3 of the instruction word typically include the register number which selects one of seven word operand registers, i.e., data registers D1 through D7 in register file 70. Bit 0 of the instruction word typically includes either a binary one to indicate respectively that this is either a single or double operand instruction, or a binary zero to indicate either a branch type instruction or shift instruction typically.

Initially, the BR field of the firmware word is decoded by decoder 500 which generates signals as indicated specifying the different firmware routines. When TCTRUE is generated, then OR gate 502 provides the signal to enable AND gates 504 to provide the next address from 9 of the bits in the NA field of the present firmware word onto the CSA lines. Thus, in response to TCTRUE, the NA field from the firmware word is utilized independent of the firmware routine in progress. In response to TCTRUE, then dependent upon the firmware routine as decoded by decoder 500 and as indicated by the BR field of the firmware word, then the CSA lines as indicated are addressed.

Dependent on the type of firmware routine, the major branch decoder 506 is provided to address CSA lines 5 through 8. Decoder 506 receives an enabling signal, TCTRUE, and is responsive to the signals from the BR field and decodes the signals bits 0 through 5 of the F register, which bits indicate the type of instruction, the data register selected, and also indicates the two most significant bits of the opcode. In response to the major branch decoder 506, CSA lines 5 through 8, i.e. the four most significant lines are addressed. In combination with such lines, the other lines will include the full address to the control store 10. By definition, any CSA address line which is not controlled in response to a given decode is left a binary zero. This may be based on the logic type used.

As indicated previously, the X0 branch allows the next address to be completely specified by the nine bits in the NA field of the firmware word. This is also true if TCTRUE is generated. If however, both the X0 branch is indicated and a TCTRUE is generated, gates 508 are enabled and only the seven most significant bits of the next address are configured from the NA field. The two least significant bits, i.e. bit 0 and bit T1 (which are wire-ORed as are all the other lines onto the CSA lines 0 through 8), are provided so that CSA bits 0 and 1 are forced to binary 1. This enables branching within a major branch firmware routine to any one of three locations during execution of the X0 minor branch.

As in the case of all branches, for the TCTRUE state, then the next address is provided by means of the NA field of the firmware word. This is accordingly true for the fetch routine (CF). Thus, for TCTRUE, and if the XF routine is indicated by decoder 500, if the memory indicates that there has been an error indicated which has been recovered, then a location is forced by control of line 1 of the CSA lines so that this recoverable condition may be noted such as by incrementing a counter, such address formation being provided by the full enabling of AND gate 510 in response to the MEMOK signal which indicates the recoverable error situation. Such address is made up of the bits 5 through 8 as provided by decoder 506, whereas bits 0 and 2 through 4 are left a binary zero.

With TCTRUE generated, the XA branch will allow the next address to be configured primarily from the decoding of the address syllable of the current instruction word depending of the type of instruction and the opcode thereof. If of course, the signal TCTRUE is present, the next address will be configured by the NA field. Depending upon the type of instruction, bit 0 of the F register (i.e., F0) will be either a binary one or a binary zero. If F0 is a binary one, gate 512 will be enabled if both the XA signal and the TCTRUE signal have enabled AND gate 514. This will enable decoder 516 which will decode the contents of the so-called address syllable in bits 9 through 15 of the F register 36 to provide an address on lines 1 through 4, the least significant bit being left a binary zero for all major branches. The other bits, bits 5 through 8 on the CSA lines will be provided in response to the decode provided by decoder 506. If on the other hand, bit F0 is a binary zero as indicated by F0, then instead of enabling decoder 516, gate 518 which is enabled in response to the enabling of gate 514 will enable decoder 520 thereby providing on CSA lines 1 through 4 the decode of bits 4 through 8 of the F register which bits 4 through 8 comprise the opcode in the instruction word. Thus, an address branch will provide an address in response to the address syllable or the opcode contained in the instruction in F register 36.

In response to the generic branch (XG), bits 2 through 4 on the CSA lines are provided with a special address. This assumes the presence of TCTRUE. Such bits 2 through 4 are configured in accordance with the decode of bits 12 through 14 of the E register. This portion of the address is provided by the enabling of gate 522. The two least significant bits are left zero.

The read branch (XR) and the write branch (XW) both utilize the decode provided by decoder 524 in response to F register bits 1 through 8 which are the bits which indicate the data register selection, and the opcode of the instruction word. Signals XR and XW via OR gate 526 fully enable AND gate 528 if TC is true thereby enabling decoder 524 to provide a portion of the address on bit lines 1 through 4 of the CSA lines with bit 0 being left a zero and bits 5 through 8 being provided via the major branch decoder 506. With respect to the read branch, it may by way of example allow the fetch of an indirect address or the fetch of an operand in memory. With respect to the write branch, the firmware selection of a word is based on whether a half or full word address or operand is to be loaded to memory or to a register.

The execute branch, when TCTRUE is generated, fully enables AND gate 530 which enables decoder 532 which in response to bits 0 through 8 of the F register, provides a portion of the address on bit lines 2 through 4 of the CSA lines with bits zero and one being left zero and bits 5 through 8 being provided by decoder 506. The XE branch allows micro-routines to execute instructions such as add, load, multiply, etc.

Having described the invention, what is claimed as new and novel and for which it is desired to secure Letters Patent is:

1. A data processing system comprising:
  A. an instruction register for storing an instruction word for indicating both a code of an operation to be performed in said system and an address indicator for pointing to a control word which is to provide control signals for effecting said operation indicated by said code;
  B. a control storage device having a plurality of said control words stored therein, each of said control words including a plurality of fields, said fields providing said control signals for controlling the operation of said system, one of said fields for indicating an address of the next location to be addressed dependent upon a specified test result;
  C. a memory device having a plurality of locations, each location for storing a word, some of said words including an operand;
  D. a base register for use primarily in storing a base address of a said location in said memory device;
  E. an index register for storing an index value for use with said base address in computing a final effective address of a said location in said memory device, said index value equal to zero if there is no such indexing required;
  F. a data register;
  G. means, responsive to the contents of said base register and said index register, for reading said operand from said memory device and writing said operand into said data register;
  H. means for transferring the contents of said data register into said instruction register so as to modify the code of operation; and
  I. control store device addressing logic, responsive to said address indicator in said instruction word in said instruction register and said field for indicating a next location address from a most recently addressed one of said control words, for generating said next location address of a location in said control storage device.

2. A system as in claim 1 wherein said control storage device addressing logic includes:
  A. test logic comprising:
    1. means, responsive to field for indicating a next location address from said most recently addressed control word, for selecting a test input from different ones of logic elements included in said system including said instruction register, and 2. means, responsive to said field for indicating a next location address from said most recently addressed control word and the state of the selected one of said test inputs, for generating a test logic output producing said specific test result; and B. next address generation logic, responsive to said test logic output, said instruction word, and said field for indicating a next location address from said most recently addressed control word, for generating said next location address in said control storage device.

3. A system as in claim 1 including means to modify the code of operation by the contents of the data register so as to indicate word, byte or bit addressing of a said location in said memory device is instructed.

* * * * *